3,445,401
METHOD OF PREPARING NOVEL MULTI-COMPONENT HETEROGENEOUS CONTACT MATERIAL

John L. Gring, Homewood, Ill., assignor to Sinclair Research, Inc., New York, N.Y., a corporation of Delaware
No Drawing. Filed Apr. 15, 1965, Ser. No. 448,272
Int. Cl. B01j 1/40
U.S. Cl. 252—455     8 Claims

ABSTRACT OF THE DISCLOSURE

There is disclosed a multi-component contact material made by bonding a crystalline alumino-silicate having a particle size of up to about 10 microns and a substantially uniform pore size of about 6 to 20 A. to an amorphous, silica-based cracking catalyst of usually at least 20 microns in the smallest dimension, with an inorganic bonding agent that is usually an oxide of an element of atomic 12 to 14. The material can be made by mixing the above components in a slurry and drying and calcining the mixture.

---

This invention pertains to novel multi-component heterogeneous contact materials which are of special utility in the conversion of heavy petroleum fractions to lower-boiling materials. The novel contact material comprises particles of a solid crystalline alumino-silicate fastened to the surface of a silica-based, amorphous cracking catalyst.

A catalyst useful in the catalytic cracking of petroleum hydrocarbon feedstocks combines a solid crystalline alumino-silicate of controlled pore size and an amorphous silicia-alumina. For example, U.S. Patent No. 2,962,435 proposes certain associations of these materials, such as a "loose" physical mixture of the two components in granular or powder form or a composite made by incorporation of the crystalline alumino-silicate into the silica-alumina while the silica-alumina is in a gel or other plastic state.

The novel contact materials of this invention marks an improvement over such associations. The contact material of this invention, by providing particles of the crystalline material fastened to the surface of an amorphous silica-based catalyst, e.g. a more or less amorphous, silica-alumina or silica-magnesia catalyst, presents the crystalline component, which usually is far more expensive than the amorphous component, in a form whereby more of the alumino-silicate is effective than in systems previously proposed, that is, less crystalline material is wastefully hidden and inaccessible within the catalyst particles. Also, the catalyst of this invention effectively guards against the segregation of catalyst components into separate layers within the system. Where a loose mixture of crystalline alumino-silicate particles, which may have an average particle size of up to about ten microns and, for example, synthetic microspherical, silica-alumina catalyst having a particle size coarser than about 75 microns is employed in a fluidized system, stratification or other harmful segregation effects are likely to occur.

In this invention, the small particle size crystalline alumino-silicate of controlled pore size and a bonding agent are mixed with a silica-based amorphous cracking catalyst, e.g. silica-alumina or silica-magnesia. The cracking catalyst particles are larger than the crystal particles, allowing for a plurality of crystal particles to become fastened to the surface of the amorphous cracking catalyst. Usually the latter cracking catalyst particles are at least about 20 microns in their smallest dimension.

A number of crystalline alumino-silicates having a substantially uniform controlled pore size are known which may be employed in this invention. The alumino-silicates often have the formula:

$$0.7\text{--}1.1\ Na_2O \cdot Al_2O_3 \cdot 2\text{--}9\ SiO_2 \cdot XH_2O$$

These materials have a uniform pore structure of exceedingly small size, the cross-section diameter of the pores generally being in a size range of about 6–20 angstroms, preferably, for many cracking procedures, about 8–15 angstroms. The useable crystalline materials are able to maintain their pore structure under the high temperature conditions of catalyst manufacture and hydrocarbon processing. They are usually prepared in the sodium salt form and it is desirable, for use in this invention, to treat the alumino-silicate to replace about 35% or more of the alkali metal ions with hydrogen or divalent and/or trivalent metal cations, preferably without altering the essential crystal structure. The sodium will preferably be at least about 75% replaced with hydrogen or metals of the II–B alkaline earth or the III–B type 4f rare earths. Suitable divalent ions include calcium, strontium, and barium, while in the lanthanide rare earths, cerium, lanthanum, neodyminum and naturally-occurring rare earth mixtures are suitable. Mixtures of different divalent cations with or without one or more trivalent cations may be used to replace sodium.

When a portion of the original sodium is to be replaced with hydrogen atoms, this may be accomplished by replacing sodium with ammonium, and heating to decompose the ammonium ion. The replacement of sodium may be conveniently brought about by contacting, for example, by soaking, the crystalline material with an aqueous solution of the cation or cations which are to replace the sodium ions. Such a solution is usually made by dissolving a salt of the desired metal in distilled or deionized water. Suitable salts include the chlorides, nitrates or acetates. Excess and extraneous ions will usually be washed out of the mineral before the catalyst is completed. Ordinarily about 50 to 500 grams of the salt or salts are used per liter of water, preferably about 100 to 300 g./l. Enough solution is generally used to give a slurry of alumino-silicate in solution containing about 1 to 20% solids, preferably about 5%. The sodium may be replaced during any one of a number of stages in the manufacture of the finished contact material.

Solid oxide catalysts, both naturally occurring activated clays and synthetically prepared gel catalysts, as well as mixtures of the two types, have long been recognized as useful in catalytically promoting conversion of hydrocarbons. A popular "natural" catalyst is "Filtrol" which is acid-activated montmorillonite. For cracking processes, the solid oxide catalysts which have received the widest acceptance today are usually activated or calcined predominantly silica or silica-based, e.g. silica-alumina, silica-magnesia, silica-zirconia, etc., compositions in a state of slight hydration and containing small amounts of acidic oxide promoters in many instances. In this invention the oxide catalyst will ordinarily contain a substantial amount of a gel or gelatinous precipitate comprising a major portion of silica and at least one other material, such as alumina, magnesia, etc. The use of wholly or partially synthetic gel catalysts, which are more uniform and less damaged by high temperatures in treatment and regeneration, is preferable. Popular synthetic gel cracking catalysts generally contain about 10 to 30% alumina. Two such catalysts are "Aerocat" which contains about 13% $Al_2O_3$ and "High Alumina Nalcat" which contains about 25% $Al_2O_3$, with substantially the balance being silica. The catalyst may be only partially of synthetic material; for example, it may be made by the precipitation of silica-alumina on clay, such as kaolinite or halloysite. One such semi-synthetic catalyst contains about equal amounts of silica-alumina gel and clay. An amorphous silica-magnesia catalyst can be prepared by adding a magnesium sulfate solution to a silica hydrosol. The mixture will subsequently set to a hydrogel which can be treated with ammonium hydroxide solution, washed and dried to give the gel. A silica hydrosol for this preparation is conveniently made by adding sodium silicate solution to a sulfuric acid solution. The composition of the silica-magnesia catalyst may be about 10–80% MgO, preferably about 15–35% MgO, with the remainder essentially $SiO_2$.

The bonding agent will generally be a material suitable for easy handling with the amorphous catalyst material and with the crystalline alumino-silicate particles, and which retains its effectiveness at the high temperatures to which the contact material will be exposed. These requirements dictate the use of an inorganic solid material as the bonding agent. Those agents which require exposure to heat in order to fasten together the contact material components are suitable and often are preferred. The bonding agent will generally comprise one or more oxides of the elements of atomic number 12–14. Aluminous and siliceous materials are usually chosen as the bonding agent.

Especially desirable for use as a bonding agent is alumina of the type set forth in copending application Ser. No. 111,798, filed May 22, 1961, U.S. Patent No. 3,235,919, issued Apr. 12, 1966. This alumina is boehmite as identified by X-ray diffraction. Electron micrographs show this boehmite to be a mass of interlocked needle-like particles. These minute elongated particles are hypothesized to be aggregations of smaller crystalline units of boehmite. High resolution electron microscopy, for instance, at approximately 150,000 magnifications, reveals that these elongated particles have a non-homogeneous appearance, indicating that they are composed of some small sub-units, and are not integral single crystals. In this sense, the particles are polycrystalline aggregations of small crystals. Generally, the elongated particles of alumina monohydrate exhibit irregular edges.

A representative sample of particles of this boehmite useable as a bonding agent in the contact material of the present invention is characterized by an average crystallite size determined from the X-ray diffraction pattern, generally greater than about 40 or 50 angstroms, for instance, of about 80 angstroms. When oven-dried to, say 110° C., the boehmite has a total pore volume generally of about 0.5 to 2.5 cc./gram and pore structures which total at least about 0.5 cc./gram in pores larger than about 80 or even larger than about 100 angstroms in size (radius).

This boehmite can be prepared, for instance, by mixing an aqueous solution of aluminum chloride and urea containing generally from about 0.3 to 1.3, preferably about 0.3 to 0.4, molar concentration of aluminum chloride and generally about 0.075 to 4, preferably about 0.5 to 1, molar concentration of urea, with a heated aqueous medium, preferably by adding the chloride solution to the heated medium. The heated medium is generally at a temperature of from about 165° F., to boiling and is employed in a volume ratio to the aluminum chloride-urea solution of generally from about 0.01 to 0.5 to 1, preferably from about 0.1 to 0.2 to 1, to form a hydrous alumina by precipitation. The heated aqueous medium can be water, mother liquor (initial filtrate from a previous preparation), a slurry of alumina hydrate including other components from a previous preparation or an aqueous ammonium chloride solution containing generally from about 0.05 to 8 molar concentration, preferably from about 1 to 3 molar concentration of ammonium chloride. The boehmite will crystallize from the mixture and may be removed from the aqueous medium by filtration. Often the boehmite will be washed to remove excess chloride or other undesirable ions but usually is not dried before mixture with the other components of the finished contact material.

The finished contact material used in this invention can be macrosize, for instance, in bead or tablet form, or finely divided form, for use as a fixed, moving or fluidized bed. The advantages of this invention will be best realized if the amorphous catalyst component is first formed to the final desired size before mixing with the bonding agent and crystalline alumina-silicate. If the contact material is to be used in fixed bed operation it should be formed into particles in which the smallest linear dimension is about 1/32 inch. This often is accomplished by grinding or otherwise providing the amorphous gel catalyst in a small particle size and forming the particles into macrosized catalyst by any standard forming technique, for example, extrusion or tabletting. It is sometimes advantageous to mix the mineral with an extender material to facilitate forming, for example, silica or alumina. If such materials are used they will preferably constitute not more than 50% of the composition. Often this invention will provide a finely divided (fluid) catalyst, for instance having particles predominantly in the 20 to 100 or 150 micron range, that is, smaller than about 100 mesh, to be disposed as a fluidized bed in the reaction zone to which a feed is charged continuously and reacted essentially in the vapor phase. Catalysts often are provided as microspheres in this size range by spray drying.

The novel catalyst of this invention in its final form will usually contain about 50 to 90% of the amorphous catalyst component, about 5 to 25% crystalline aluminosilicate and 5 to 25% bonding agent. Preferably, these proportions will be about 60 to 80 parts silica-alumina or silica-magnesia/10 to 20 parts crystalline alumino-silicate/10 to 20 parts bonding agent. The mixture of components used to form the catalyst will comprise solids having about the above mentioned proportions of these materials and in addition will usually contain at least about 50% by weight of the solids of free water. Thus it often is preferable to mix the ingredients at an advanced stage of catalyst manufacture, but before they have received the final drying for removal of free water. Often the three components may be mixed in an aqueous slurry containing perhaps about 20% solids, filtered, dried and calcined to activate the catalyst. Calcination may be conducted in the regenerator of the catalytic cracking unit. The finished contact material of this invention will consist of particles of amorphous aerogel or dried cracking catalyst covered with the bonding agent and having a plurality of particles of the crystalline alumino-silicate fastened to the surface thereof.

Catalytically promoted cracking of heavier hydrocarbon feedstocks to produce hydrocarbons of preferred octane rating boiling in the gasoline range is widely practiced and ordinarily gives end products of fairly uniform composition. Cracking is ordinarily effected to produce gasoline as the most valuable product and is generally conducted at temperature of about 700 to 1100° F. preferably about 850 to 975° F. at pressures up to about 200 p.s.i.g., preferably about atmospheric to 5, 15 or even 100 p.s.i.g. and without substantial addition of free hydrogen to the system. In cracking, the feedstock is usually a mineral oil or petroleum hydrocarbon fraction such as straight run or recycle gas oils or other normally liquid hydrocarbons boiling above the gasoline range. The contact material of this invention is especially useful in cracking hydrocarbon feedstocks having an initial boiling point of about 500° F., or more. Such materials include reduced crudes and other residual stocks, asphalt, the product from butane and/or pentane deoiling of asphalt, etc. A batch, semi-continuous or continuous system may be used, but most often a continuous fluidized system is used. In such system, vaporous cracker effluent is taken overhead and a portion of the catalyst is continuously withdrawn and passed to a regeneration zone where coke or carbon is burned from the catalyst in a fluidized bed by contact with a free oxygen-containing gas before its return to the reaction zone. In a typical operation, the catalytic cracking of the hydrocarbon feed would normally result in the conversion of about 40 to 70%, preferably about 50 to 60% of the feedstock into a product boiling in the gasoline range. The effluent from the cracker conveniently is distilled to isolate the gasoline fraction. Also, products, such as fixed gases, boiling below the gasoline range, are removed from the system.

In cracking coke yield may be held to a minimum through the use of good steam stripping and a high steam partial pressure, and removal of coke from the catalyst is performed by regeneration. Regeneration of a catalyst to remove carbon is a relatively quick procedure in most commercial catalytic conversion operations. For example, in a typical fluidized cracking unit, a portion of catalyst is continually being removed from the reactor and sent to the regenerator for contact with air at about 950 to 1200° F., more usually about 1000 to 1150° F. Combustion of coke from the catalyst is rapid, and for reasons of economy only enough air is used to supply the needed oxygen. Average residence time for a portion of catalyst in the regenerator may be on the order of about six minutes and the oxygen content of the effluent gases from the regenerator is desirably less than about ½%. The regeneration of any particular quatum of catalyst is generally regulated to give a carbon content of less than about 5.0%, generally less than about 0.5%. Regeneration put the catalyst in a substantially carbon-free state, that is, the state where little, if any, carbon is burned or oxygen consumed even when the catalyst is contacted with oxygen at temperatures conducive to combustion.

The novel contact material of this invention also may sometimes be used as a support for a heavy-metal promoted catalyst. Such catalysts usually have a metal or metal oxide selected from Groups VIII and/or VI–B of the Periodic Table (Webster's Third International Dictionary 1961, p. 1680), distended on the support and are useful in hydrocarbon conversion processes wherein free hydrogen is added to the system. For example, hydrocracking is usually performed at temperatures higher than about 600° F., say, temperatures in the range of about 600 to 900° F., preferably about 700 to 850° F. and pressures in the range of about 100–10,000 p.s.i.g., preferably about 1000–2000 p.s.i.g. A space velocity of about 0.1 to 10 weight of oil feed per weight of catalyst may be employed. Preferably the WHSV is about 0.25–2.0. Hydrogen is provided from any convenient source and hydrogen consumption may be, for instance, in the range of about 2000 to 3000 cubic feet per barrel of charge. The effluent from the hydrogenolysis unit is generally separated by fractionation. In hydrocracking a batch, semi-continuous or continuous system may be used, but most often a continuous system is used.

The invention will be better understood by reference to the following example, which should be considered illustrative only and not limiting.

A crystalline alumino-silicate was obtained having substantially uniform pores of about 13 A. This material contained 32% matter lost on ignition, 43% silica, 14% alumina, 10.9% $Na_2O$ and 1.7% CaO. 150 grams of these particles are repeatedly contacted ten times with 650 ml. of 0.2 molar ammonium hydroxide, dried and heated to 720° F. for three hours. Then the zeolite is repeatedly contacted ten times with 0.5 liter of 0.2 molar calcium acetate solution and water washed (using three portions of 500 cc. each). Filtration is used to separate the solid and liquid phases in each instance.

The resulting product is stirred into 10 liters of deionized water along with 1105 grams of washed but amorphous silica-alumina microspheres of about 42% solids content (12% $Al_2O_3$–88% $SiO_2$. Ig. basis), ready for final drying, and 323 grams of small particle crystalline boehmite which had been produced as follows:

0.96 pounds of $AlCl_3 \cdot 6H_2O$ and 0.72 pounds of urea were dissolved in water and made to 1.2 gallons, equivalent to 0.3 molar with respect to aluminum chloride and 1.0 molar with respect to urea. This is 100% excess urea.

During a period of 216 elapsed hours the above solution was added slowly to a reaction flask containing 0.5 gallons of heated and stirred aqueous solution containing 0.535 pound of ammonium chloride. After this time, heating was discontinued and carbon dioxide was bubbled into the reaction flask over a three-hour period while the temperature decreased from 212° F., to 110° F. The reaction mixture was filtered through a Buchner funnel and an alumina hydrate cake was retained in the funnel. The cake was washed three times using 0.4 gallons of deionized water over a two-hour period. At the end of this time the filtrate gave a negative chloride reaction. The undried boehmite material contained about 31% boehmite and 69% water.

The three ingredients are mixed and filtered, giving a relatively uniform filter cake which is dried at about 235° F., then heated during four hours at 1000° F., held for three hours, cooled, and processed through an 80-mesh Tyler sieve to give a product containing 70% by weight of low-alumina cracking catalyst having 15% crystalline alumino-silicate bonded to its surface, and 15% boehmite. When submitted to test cracking procedures, the product proves to be of superior cracking characteristics.

It is claimed:

1. A method for making a multi-component catalyst comprising particles of a crystalline alumino-silicate fastened to the surface of a dried, amorphous, silica-based catalyst which comprises:
   (1) forming an aqueous slurry of
      (a) a dried, amorphous, silica-based finely-divided catalyst of greater than about 20 microns particle size,
      (b) a crystalline alumino-silicate having an average particle size of up to about 10 microns and having substantially uniform pores in a size range of about 6 to 20 A., and
      (c) a solid bonding agent comprising one or more oxides of the elements of atomic number 12 to 14, the solids portion of said slurry comprising about 50 to 90 percent of said silica-based catalyst, about 5 to 25% of said crystalline alumino-silicate, and about 5 to 25 weight percent of said bonding agent, and said slurry comprising at least 50 weight percent free water based on the total solids content thereof,
   (2) filtering said slurry to provide a filter cake and
   (3) drying said filter cake at elevated temperatures, thereby causing said bonding agent to fasten the crystalline alumino-silicate to the surface of said silica-based catalyst.

2. The method of claim 1 wherein said bonding agent is boehmite alumina, has a crystallite size of greater than about 50 A. and constitutes from about 10 to 20 percent of the solids portion of said slurry.

3. The method of claim 1 wherein said crystalline alumino-silicate has a pore size of from about 8 to 15 A. and constitutes from about 10 to 20 weight percent of the solids portion of said slurry.

4. The method of claim 1 wherein said amorphous, silica-based catalyst has a particle size above about 75 microns and constitutes from about 60 to 80 weight percent of the solids portion of said slurry.

5. A method for making a multi-component catalyst comprising particles of a crystalline alumino-silicate fastened to the surface of a dried, amorphous, silica-alumina catalyst which comprises:
   (1) forming an aqueous slurry of
      (a) a dried, amorphous, finely divided silica-alumina catalyst of greater than about 75 microns particle size,
      (b) a crystalline alumino-silicate having an average particle size of up to about 10 microns and having substantially uniform pores in a size range of about 8 to 15 A., and (c) a solid bonding agent comprising boehmite alumina having a crystallite size of greater than about 50 A., the solids portion of said slurry containing about 60 to 80 weight percent of said silica-based catalyst, about 10 to 20 weight percent of said crystalline alumino-silicate and about 10 to 20 weight percent of said bonding agent, and said slurry comprising at least 50 weight percent free water based on the total solids content thereof, (2) filtering said slurry to provide a filter cake and (3) drying said filter cake at elevated temperatures, thereby causing said bonding agent to fasten the crystalline alumino-silicate to the surface of said silica-based catalyst.

6. The multi-component catalyst prepared by the method of claim 1.

7. The multi-component catalyst prepared by the method of claim 2.

8. The multi-component catalyst prepared by the method of claim 5.

References Cited

UNITED STATES PATENTS

| 3,194,754 | 7/1965 | Fahnestock | 208—120 |
| 3,260,680 | 7/1966 | Sanford et al. | 252—455 |

FOREIGN PATENTS

| 1,040,005 | 10/1958 | Germany. |
| 1,161,869 | 1/1964 | Germany. |

DANIEL E. WYMAN, *Primary Examiner.*

C. F. DEES, *Assistant Examiner.*

U.S. Cl. X.R.

208—120